United States Patent [19]

Sinclair

[11] 3,945,180

[45] Mar. 23, 1976

[54] CAM OPERATED REEL LOCK AND ADJUSTMENT

[75] Inventor: Donald J. Sinclair, Silvis, Ill.

[73] Assignee: International Harvester Company, Chicago, Ill.

[22] Filed: Feb. 10, 1975

[21] Appl. No.: 548,482

[52] U.S. Cl. ................................................ 56/221
[51] Int. Cl.² .......................................... A01D 57/04
[58] Field of Search ............................. 56/221–225

[56] References Cited
UNITED STATES PATENTS

| 2,345,847 | 4/1944 | Wink | 56/221 |
| 2,795,920 | 6/1957 | Steverwald | 56/221 |

Primary Examiner—Louis G. Mancene
Assistant Examiner—J. N. Eskovitz
Attorney, Agent, or Firm—F. David AuBuchon; Floyd B. Harman

[57] ABSTRACT

A harvester reel adjusting and locking mechanisms for positioning the bearing carrier at each end of the reel axle at a selected distance along the support arm on which it is slidable. The carrier is provided with holes which are capable of registering with a series of closely spaced holes in the outer end region of the support arm. An operating tool having a vertical shank portion serves to lock the carrier in an adjusted position when such shank is projected through one of the holes in the carrier and a selected registering hole in the support arm. A radial displacement cam is disposed on the shank portion and is of such extent that when the shank portion is positioned in a hole immediately forwardly or rearwardly of the carrier and then rotated through an angle of 180°, the carrier will be shifted in a forward or a rearward direction to a degree equal to the center-to-center distance between adjacent holes, after which the shank may be placed in the hole in the carrier and a registering hole in the support arm to lock the carrier in position. A lateral leg on the shank constitutes a lever by means of which torque may be applied to the shank for rotational purposes. By repeating the process, the carrier may be "walked" or indexed along the support arm in either a forward or a rearward direction.

8 Claims, 3 Drawing Figures

CAM OPERATED REEL LOCK AND ADJUSTMENT

The present invention relates to an adjusting and locking mechanism by means of which forward or rearward movement of a harvester reel with respect to the combine platform or header on which it is mounted may be effected in order to adjust the reel relative to the cutting mechanism of the platform.

In connection with conventional platform reels, it is common practice to utilize a forwardly extending upwardly inclined support arm on each side of the platform, together with a sleeve-like bearing carrier which is slidable on the support arm in a fore and aft direction. By shifting the bearing carrier in one direction or the other along the support arm, the position of the associated reel bearing at one end of the reel may be varied and by thus controlling the position of the two bearings at the opposite ends of the reel, the distance between the reel bats and the cutter mechanism associated with the platform or header may be adjusted to accomodate the requirement of different crops and crop conditions. Coupled with such forward adjustment of the bearing carriers on the support arms, means are provided for varying the inclination of the support arms in order to attain a desired elevation of the reel with respect to the cutter mechanism.

Heretofore, in order to effect either forward or rearward adjustment of one of the bearing carriers on its respective support arm it has been necessary to rely upon the application of direct manual force to the reel in order to bring a set screw which is disposed on the carrier into selective register with a series of closely spaced holes which are formed in the support arm after which the set screw is the reel bearing carrier on the support arm is frequently difficult, especially when the sleeve-like carrier has been clogged with dirt. The use of a pry tool or impact implement may be resorted to overcome the frictional resistance to shifting of the carrier but when it is considered that the operator must actually observe the set screw and locking holes therefor to insure proper set screw and hole alignment before tightening the set screw, the working of a given bearing carrier to its final proper adjusted position becomes a matter of trial and error. Forward uphill shifting of the bearing carrier along the inclined support arm is particularly difficult due to the weight of the reel.

The present invention is designed to overcome the above-noted limitations that are attendant upon the effecting of harvester reel adjustments and, toward this end, the invention contemplates the provision of a novel form of reel bearing carrier, together with an associated actuating and locking tool therefor, the tool functioning by a cam and lever principle to facilitate manual shifting of the carrier along its support arm in either a forward or a rearward direction and, when the carrier has been shifted to a desired position, the tool functioning to lock the carrier in position on the support arm.

Briefly, in carrying out the invention, the support arm is provided with a longitudinal row of equally and closely spaced reaction holes therein and the carrier is provided with at least one locking hole which is capable of selective register with the holes in the support arm. The operating tool embodies a shank portion having a radially extending cam thereon and the cam is so designed that when the shank portion is positioned in one of the holes immediately forwardly or rearwardly of the carrier and then rotated through an angle of 180° swinging movement of the cam will effect its engagement with one end of the carrier and a consequent forcible camming action will take place whereby the carrier is shifted or indexed longitudinally along the support arm in one direction or the other by a distance equal to the effective stroke of the cam, such stroke being such that the carriage will be advanced by a distance equal to the center-to-center distance between each pair of adjacent holes in the support arm. At the end of the effective stroke of the cam, the hole in the carrier will register with one of the holes in the support arm so that, thereafter, by inserting the shank portion of the tool into the two registering holes, the carrier may be locked in its thus adjusted position on the support arm. By repeating the process of inserting the shank portion of the tool in successive holes along the support arm, either forwardly or rearwardly of the carrier, and rotating the tool after each such insertion, the carrier may be "walked," so to speak, forwardly or rearwardly, one step at a time until the desired position has been attained, after which the shank portion of the tool may be inserted in the hole in the carrier as previously set forth, to lock the carrier in its adjusted position. A laterally turned leg on the operating tool constitutes a lever or moment arm by means of which torque may be applied to the shank portion of the operating tool to rotate the same and swing the cam during its operative carrier-impelling stroke.

By such an arrangement the operating tool functions not only as an actuating tool to impel the carrier along the support arm, but it also functions as a locking element to secure the carrier in position after it has been properly adjusted. Additionally, when the operating tool is not in use but, instead, is functioning as a locking member, the carrier affords a storage position for the tool so that at no time is the tool obliged to leave the vicinity of the carrier and therefore is unlikely to become misplaced or lost.

The provision of a harvester reel adjusting and locking mechanism such as has briefly been outlined above constitutes the principal object of the present invention.

The provision of an adjusting and locking mechanism which is extremely simple in its construction and which therefore may be manufactured at a low cost; one which may be constructed as original equipment or applied to existing platforms or headers without requiring extensive modification thereof; one which is rugged and durable and which therefore will withstand rough usage; and one which otherwise is well adapted to perform the services required of it are further desirable features which have been borne in mind in the production and development of the present invention.

Other objects and advantages of the invention, not at this time set forth, will become readily apparent as the following description ensues.

In the accompanying single sheet of drawings forming a part of this specification, one illustrative embodiment of the invention has been shown.

Figure 1:
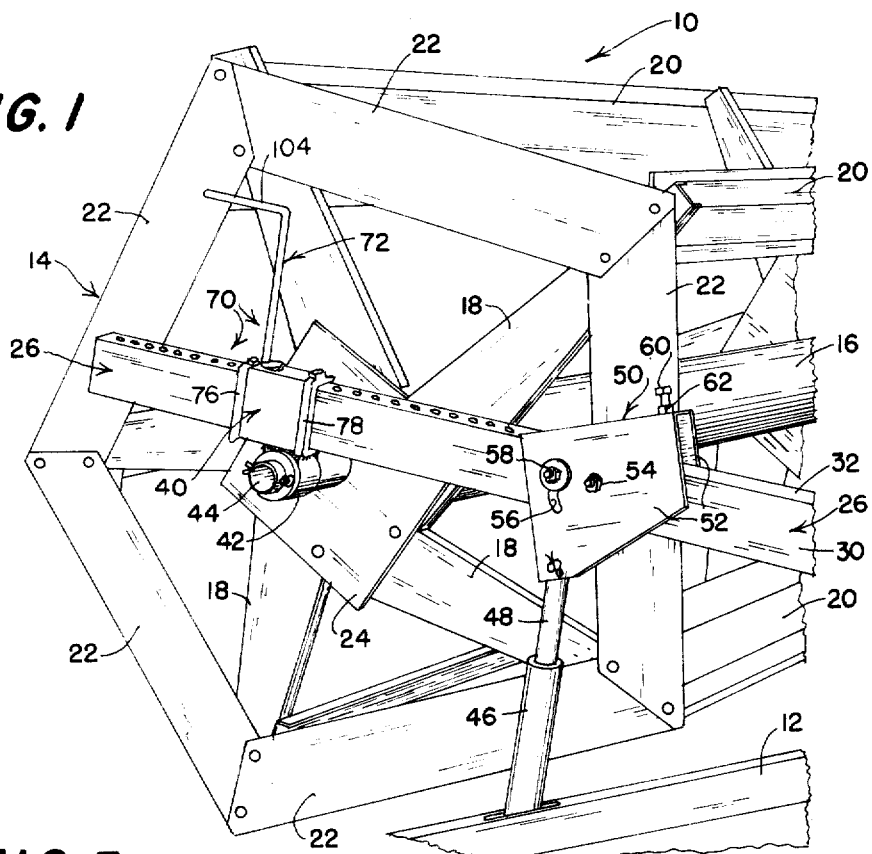
FIG. 1 is a fragmentary perspective view of a limited forward left end portion of a combine header or platform and its associated reel and showing the improved reel adjusting and locking mechanism operatively installed thereon.

Referring now to the drawings in detail, and in particular to FIG. 1, the improved reel adjusting and locking mechanism of the present invention has beend disclosed herein in connection with a harvester reel assembly 10 which is adjustably supported in an elevated position forwardly of a platform or header 12 which is carried at the lower forward end of a feeder (not shown) which, in turn, is carried at the forward end of a harvesting combine. Only one side wall of the platform 12 is disclosed herein. It will be understood that the platform and its associated reel are provided for the purpose of cutting and gathering a standing crop, such as wheat for example, and directing the cut crop to the feeder which is in the form of an infeed elevator by means of which the crop is conducted to separating instrumentalities associated with the combine. An example of such a combine is shown and described in U.S. Pat. No. 3,828,793 that issued on Aug. 13, 1974 and is entitled "Crop Feeding Mechanism for Axial Flow Combines."

The reel 10 may be of any conventional design, the particular reel selected for illustration herein consisting of a cage-like structure 14 including a tubular frame axle 16 having spider-like end members including generally radially extending arms 18 across which there extend peripheral transverse bats 20, the function of which is to urge the cut crop rearwardly and into the platform. Reel end guard members 22 extend between adjacent arms 18 on each end member 14 while a rectangular reinforcing plate 24 establishes a hub for the various arms 18 of each end structure 14. Although only the left hand end member 14 has been disclosed herein, it will be understood that the other end member is substantially identical in structure and is disposed adjacent to an opposing end wall similar to the disclosed wall of the platform 12.

The reel 10 is supported in a conventional manner from the platform by a pair of forwardly and upwardly inclined reel support arms, only the left hand arm being shown in FIG. 1 and designated by the reference numberal 26. Each arm 16 is of hollow tubular construction and presents inside and outside vertical side walls 28 and 30 and interconnecting top and bottom walls 32 and 34 (see also FIG. 2). It will be understood that the arms 26 are pivoted adjacent their proximate rear ends to appropriate points on the platform 12.

Each end of the reel 10 is adjustably supported from the outer or distal end region of its associated support arms 26 by means of a sleeve-like adjustment bracket or carrier 40 which is longitudinally slidable on the arm and which, according to the present invention, is capable of being locked in any selected position of longitudinal adjustment therealong in a manner that will be described in detail presently. The adjustment bracket or carrier serves to support a reel bearing 42 (FIG. 1) which is welded or otherwise secured to the underneath surface of the bottom wall 34 of the carrier 40 and which receives therethrough the adjacent end region of a central reel-supporting shaft 44.

Vertical reel movements are effected under the control of a hydraulic reel lift cylinder 46 which is pivoted at its lower end to a fixed point on the platform, there being one such lift cylinder for each end of the reel. Each lift cylinder is provided with a plunger 48 which, when fully extended, maintains the reel in its fully elevated position. Fine adjustments of each end of the reel may be accomplished under control of an adjusting bracket 50 of deep U-shape design and having side flanges 52 which straddle the reel support arm 26 and are pivoted thereto by a through bolt 54. An arcuate slot 56 is formed in each side flange 52 and a clamping bolt 58 projects through the slots 56 and through the support bar 26 and, when tightened, serves to secure the adjustment bracket 50 in any selected position of adjustment. A regulating thrust screw 60 is threadedly received through the top wall or bight portion of the bracket and bears against the top wall 32 of the reel support arm 26. A lock nut 62 serves to maintain the thrust screw 58 in any position of adjustment.

The general arrangement of parts thus far described is purely conventional and no claim is made herein to any novelty associated with the same, the novlty of the present invention residing rather in the particular nature of the reel adjusting sleeve or carrier 40 and the manner in which it may be shifted longitudinally along the support arm 26 to thus move the associated end of the reel 10 forwardly or rearwardly as desired and which will now be described in detail.

Heretofore, in connection with conventional platform reels, it has been the practice to utilize channel-shaped reel support arms having upper and lower channel flanges, and also to utilize bearing supporting adjustable brackets or carriers similar to the carrier 40, the bearing carriers being slidable on the support arms and having set screws which may be brought into register with a series or row of slightly spaced holes in the lower channel flange. Forward or rearward adjustment of the reel is accomplished by loosening the set screws to withdraw them from their respective paired holes in the support arms and then sliding the bearing carriers forwardly or rearwardly as the case may be until the set screws become aligned with a different pair of holes, after which the set screws are again tightened so as to become projected into such holes. However, manual shifting of the adjustment sleeves or carriers is frequently extremely difficult due to such factors as the collection of dirt or other foreign matter within the sleeve-like carriers and the necessity for shifting both ends of the reel in timed relation to each other so that there will be no binding of either carrier on its associated support arm. Forward uphill shifting of the bearing carriers on the support arms is particularly difficult because of the weight of the reel. Set screw manipulation also presents a problem since set screw and hole alignment must be observed by the operator while carrier shifting operations are being carried out, final adjustment of the carriers usually being effected by tapping the adjustment brackets with an impact tool such as a hammer.

Figure 2:
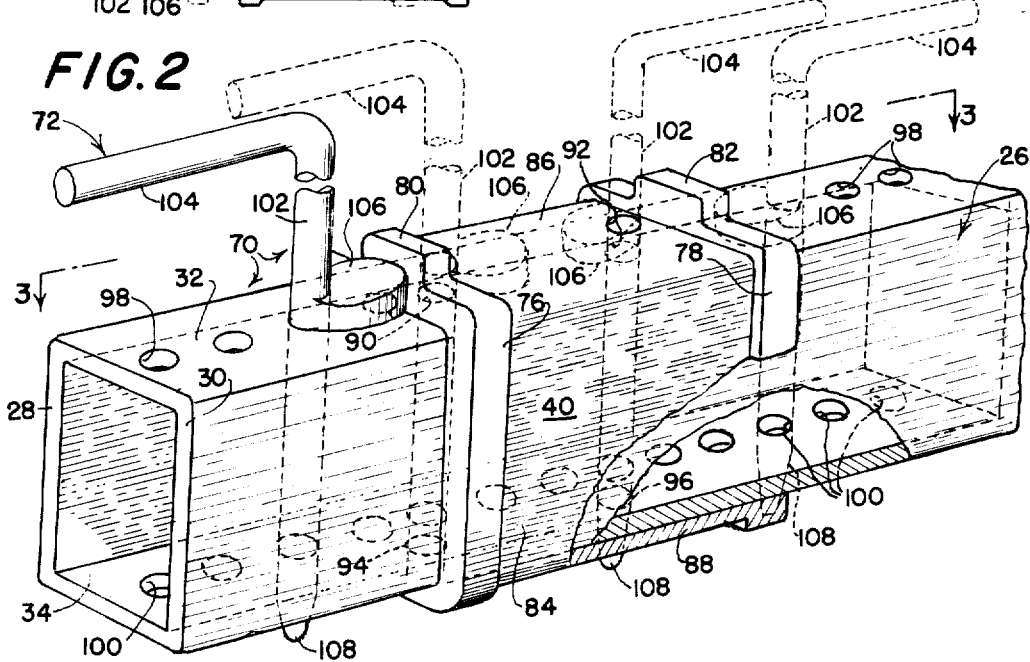
FIG. 2 is an enlarged fragmentary perspective view of the reel adjusting and locking mechanism and illustrating schematically its mode of application to and its operation in connection with a reel bearing carrier and its associated support arm.

The present reel adjusting and locking mechanism obviates these reel adjusting difficulties and a preferred form of such mechanism is disclosed in its entirety in both FIGS. 1 and 2 of the drawings and designated at 70, the details thereof and its mode of operation being clearly shown in the latter view. The mechanism 70 is comprised of but two parts, namely the aforementioned adjustment and locking sleeve or carrier 40 and an operating tool 72 in the form of a cam lever, the details of which will be described subsequently.

The adjustment sleeve or bearing carrier 40 is in the form of a relatively short open-ended tubular member of approximately square configuration which conforms to the cross sectional shape of the tubular support arm 26 which it loosely surrounds. Relatively sturdy outwardly extending rim flanges including a forward reinforcing flange 76 and a rear flange 78 are formed on the sleeve and are provided with upstanding lugs 80 and 82 respectively which serve as reaction members to assimilate the cam thrust which is offered to them by the operating tool 72 as will be described presently. The tubular bearing carrier 40 is provided with vertical side walls 84 and top and bottom walls 86 and 88 which overlie and underlie the top and bottom walls 32 and 34 of the support bar 26.

The top wall 86 of the bearing carrier 40 is provided with a pair of locking holes including a forward hole 90 which lies close to and is disposed in substantially tangential relationship with respect to the forward upstanding lug 80, and a rearward hole 92 which lies close to and is disposed in substantially tangential relationship with respect to the upstanding lug 82. Similar holes 94 and 96 are formed in the bottom wall 88 of the carrier 40 in vertical alignment with the holes 90 and 92 respectively. The holes 90, 92, 94 and 96 constitute storage and locking holes for the operating tool 72 as will become clear presently. The top wall 32 of the tubular support bar 26 is formed with a series or row of equally and longitudinally closely spaced apart holes 98 while the bottom wall 34 of the bar 26 is formed with a similar row of holes 100, the holes 98 and 100 being arranged in vertically aligned pairs. The center-to-center distance between the holes 90 and 92 in the top wall 86 of the sleeve-like adjustment carrier 40 is a multiple of the center-to-center distance between adjacent holes 98 in the top wall 32 of the support arm, the particular multiple being a function of the selected length of the carrier 40. In the illustrated form of the invention the distance between the two holes 90 and 92 is equal to the distance between any given hole 98 and a hole three times removed therefrom.

The operating tool 72 is in the form of a length of cylindrical rod stock bent to L-shape form and having a vertical leg or shank portion 102 and a horizontal leg or lever portion 104. Welded to the vertical leg 102 approximately midway between its ends is a laterally extending displacement cam 106 of generally elliptical configuration, the major elliptical axis of the cam 106 extending radially of the leg 102. The free end portion of the leg 102 is tapered as indicated at 108. The radial extent of the cam 106, i.e. the distance which it projects radially outwardly of the vertical leg 102 is precisely equal to the edge-to-edge distance between adjacent holes 98 in the top wall 32 of the support arm. Stated otherwise, the effective length of the cam 106 is equal to the center-to-center distance between adjacent holes 98 in the top wall 32 of the reel supporting arm 26. The longitudinal or axial extent of the adjusting or locking sleeve or carrier 40 may vary within reasonable limits but in any event it is essential that its effective width be equal to an edge-to-edge measurement between two holes 98 in the top wall 32 which are several times removed from each other as clearly shown in FIG. 3 and for a purpose that will be made clear when the operation of the tool 72 is described. In the illustrated form of the carrier 40, the width of the carrier is equal to the edge-to-edge distance between two holes 98 which are five times removed from each other.

Considering now the operation of the herein described reel adjusting and locking mechanism 10, and assuming that the reel lift cylinder 46 has been operated to maintain the support arm 30 in its raised position, reel adjusting operations by means of which the reel may be set so as to maintain the proper alignment and distance between the various bats 20 and the cutter mechanism of the platform 12 may be carried out by simultaneous adjustment of the right and left hand carriers 40, utilizing a workman on each side of the combine, or they may be conducted by a single workman operating first on one side of the combine and then on the other. Insofar as the left hand bearing carrier 40 of FIG. 2 is concerned, such carrier may be worked or indexed either forwardly or rearwardly along the support arm 26 in step-by-step fashion in order to bring the adjacent end of the reel to its proper adjusted position. The manner in which a single rearward stop of adjustment of such carrier is accomplished is disclosed schematically in both FIGS. 2 and 3.

Figure 3:
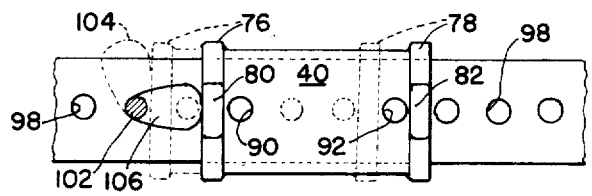
FIG. 3 is a sectional view taken on the horizontal plane indicated by the line 3—3 of FIG. 2 and in the direction of the arrows.

Assuming that the carrier 40 initially is disposed in its dotted line position as shown in FIG. 3, a single rearward step of movement of the carrier may be accomplished by first removing the operating tool 72 from its stored and locking position in the holes 90 and 94 of the carrier 40 and inserting the shank portion 102 thereof into the hole 98 which is disposed immediately forwardly of the rim flange 76 of the carrier and causing the underneath side of the cam 106 to seat squarely on the top wall 32 of the support arm 26 so that such cam lies alongside such flange in substantially tangential relation with respect thereto as shown in dotted lines. The cam 106 is disposed sufficiently high on the vertical shank portion 102 of the tool 72 that the lower end region thereof may project through the hole 100 in the bottom wall 34, the pointed end 108 of the tool serving to facilitate location of such hole and to minimize any "fishing" operations.

After the tool 72 has been thus positioned in the holes 98 and 100, the tool 72 will be rotated through an angle of approximately 90° to shift the cam 106 to its full line position as shown in FIGS. 2 and 3. During such swinging movement of the cam, the rearward side edge thereof will engage the reaction lug 80 on the forward rim flange 76 of the carrier and, by a camming action, cause the entire carrier to be shifted or indexed bodily to its full line position wherein the holes 90 and 96 in the top and bottom walls 86 of the carrier will register with the vertically aligned holes 98 and 100 which are twice removed rearwardly from the tool 72. The tool may then be withdrawn from the support arm 20 and inserted in such four aligned holes, thereby securely locking the carrier in its adjusted position on the support arms 26.

It is to be noted that in its newly adjusted position, the aligned holes 98 and 100 which are once removed from the original holes lie immediately forwardly of the rim flange 76 so that if a second rearward adjustment step is required before locking the carrier 40 in position on the support arm 26, these latter vertically aligned holes may be utilized for a repetition of the carrier shifting operation before the tool 72 is inserted through the hole 90 for locking purposes. It is also to be noted that at the same time, the rearward rim flange 78 will also assume a position wherein it lies immediately forwardly of a hole 98 in the top wall 32 of the support arm 26 so that in any adjusted position of the carrier there will be a hole 98 available for tool shank reception if it is desired to shift the carrier 40 forwardly on the support arm 26. Forward shifting of the carrier takes place in substantially the same manner as has been described in connection with rearward shifting thereof.

The dimensional aspects of the present reel adjusting and locking mechanism whereby hole alignment at the commencement and at the completion of any given adjusting operation takes place have previously been set forth but at the risk of repetition it is pointed out that the effective length of the cam 106 is equal to the center-to-center distance between adjacent holes 98 in the top wall 32 of the carrier 40, that the center-to-center distance between the two locking holes 90 and 92 is equal to the center-to-center distance between holes 98 which are three or more times removed from each other, and that the longitudinal extent of the carrier 40 is equal to a measurement between two holes 98 in the top wall 32 which are five or more times removed from each other.

It will be understood, of course, that normal reel adjusting operations are predicated upon the fact that for any given adjustment of the reel, the locking tools at opposite sides of the platform or header will assume their locking positions in corresponding holes 98 in the right and left support arms 26, i.e. holes which are equally counted from the ends of the rows of holes in the support arms. Thus when a signle operator is effecting the reel adjustment, he may work the reel ends in the desired direction alternately so that no excessive binding of the reel shaft in the bearing 42 occurs and, when the final reel adjustment has been attained the two operating tools 72 may be set in place to effect the final locking operation.

The invention is not to be limited to the exact arrangement of parts shown in the accompanying drawings or described in this specification as various changes in the details of construction may be resorted to without departing from the spirit of the invention. For example, although the use of two locking holes 90 and 92 afford convenience in that the operating toll 72 may be placed in a lcking position close to the flanges 76 and 78 when rearward and forward adjustments of the carrier 40 are made, a single centrally located locking hole would suffice for either forward or rearward adjustment. Furthermore, the use of support arms which are of tubular construction is not essential although it is desirable where original reel supporting equipment is concerned. Where the invention is applied to existing platform or header equipment, the channel shape support arms commonly employed on such existing equipment will suffice, providing of course, that locating holes 98 and 100 be provided in both of the channel flanges. Finally, it is to be noted that although the reel bearing 42 is disclosed herein as being suspended beneath the bottom wall 34 (FIG. 1) so that such hearing assumes a position below the general level of the support arm 26, if desired the entire reel carrier 40 and its associated bearing 42 may be inverted and applied to the support arm for sliding movement therealong, in which case the bearing 42 does not obstruct entrance of the operating tool 72 into the locking holes 90, 92, 94 and 96. In such an instance it might be found expedient to provide reaction lugs similar to the lugs 80 and 82 on the wall 34 which then would become the top wall of the carrier. Therefore, only insofar as the invention has particularly been pointed out in the accompanying claims is the same to be limited.

What is claimed is:

1. In an agricultural implement, the combination with an adjustable bearing support for one end of a harvester reel associated with a combine platform, said support embodying an elongated reel-supporting arm having a longitudinal row of closely and equally spaced reaction holes formed therein, and an open-ended tubular sleeve-like carrier slidable longitudinally on said arm, a reel bearing being fixedly mounted on the carrier, an operating tool for effecting step-by-step indexing movements of the carrier on the supporting arm in increments of movement equal to the center-to-center distance between adjacent reaction holes, said tool including a shank adapted to be projected into a reaction hole next adjacent to either end of the carrier and exteriorly of the latter, a radially extending cam on said shank in the medial region thereof and effective when the shank is disposed in said next adjacent reaction hole to engage the adjacent end of the carrier and, by a camming action, index the carrier bodily throughout one increment of movement, and a crank arm on said shank for manually applying torque to the shank to rotate the same.

2. In an agricultural implement, the combination set forth in claim 1, wherein said carrier is provided with at least one locking hole therein designed for selective register with the reaction holes in said reel-supporting arm whereby, after an indexing movement of the carrier, projection of the shank through said locking hole and its adjacent reaction hole will serve to lock the carrier against longitudinal shifting movement.

3. In an agricultural implement, the combination set forth in claim 2, wherein said reel-supporting arm and carrier are both rectangular in cross section and are provided with vertical side walls and horizontal top and bottom walls, the reaction holes are formed in the top wall of the supporting arm, and the locking hole is formed in the top wall of the carrier.

4. In an agricultral implement, the combination set forth in claim 3, wherein an additional reaction hole is formed in the bottom wall of the supporting arm in vertical register with each reaction hole in the top wall thereof, an additional locking hole is formed in the bottom wall of the carrier in vertical register with the locking hole in the top wall thereof, and the linear extent of the tool shank below the cam is greater than the vertical extent of the carrier whereby the shank may be projected during carrier indexing operations through aligned reaction holes in the supporting arm and, during carrier locking operations, through aligned reaction and locking holes in the supporting arm and carrier respectively.

5. In an agricultural implement, the combination set forth in claim 4, wherein the tubular carrier is formed with reinforcing rim flanges therearound at its opposite ends which are designed for camming engagement with the cam on said operating tool.

6. In an agricultural implement, the combination set forth in claim 5, wherein each rim flange is provided with an upstanding lug which projects upwardly above the level of the top wall of the carrier, and the cam is of sufficient vertical thickness that when it rests on the top wall of the supporting arm incident to projection of the shank through a pair of reaction holes, the cam is in direct register with an adjacent lug for indexing purposes.

7. In an agricultural implement, the combination set forth in claim 6, wherein the effective radial extent of the cam is equal to the center-to-center distance between adjacent reaction holes in the top wall of the supporting arm.

8. In an agricultural implement, the combination set forth in claim 7, wherein the longitudinal extent of the carrier is equal to a multiple of the distance between adjacent reaction holes in the supporting arm.

* * * * *